United States Patent Office 3,297,627
Patented Jan. 10, 1967

3,297,627
THERMOSTABILIZED COPOLYMERS OF TRIOXANE AND PROCESS FOR PREPARING THEM USING AN IMIDAZOLIDONE-2 STABILIZER
Hans Dieter Hermann, Edgar Fischer, and Günther Roos, Frankfurt am Main, Germany, assignors to Farbwerke Hoechst Aktiengesellschaft vormals Meister Lucius & Brüning, Frankfurt am Main, Germany, a corporation of Germany
No Drawing. Filed Apr. 22, 1963, Ser. No. 274,823
Claims priority, application Germany, Apr. 28, 1962, F 36,667
8 Claims. (Cl. 260—45.8)

The present invention relates to a process for stabilizing copolymers of trioxane of high molecular weight by incorporating into the copolymer imidazolidone-2 and/or a derivative of imidazolidone-2.

Recently, thermally stable polyoxymethylenes of high molecular weight have gained considerable technical importance. They are excellently suitable for the manufacture of shaped articles by the injection molding or extrusion processes. The shaped articles are characterized especially by their hardness, strength and toughness. The two most important processes for the manufacture of polyoxymethylenes are the anionic polymerization of formaldehyde and the cationic polymerization of trioxane. The polyoxymethylenes prepared in this manner carry hydroxy groups at the chain ends and have thus a semiacetal structure. Under the action of heat the semiacetals decompose with the formation of monomeric formaldehyde. According to a so-called zipper reaction, this decomposition can lead to the quantitative disintegration of the polymer into monomeric formaldehyde. Polyoxymethylenes which are subjected to the action of heat should, therefore, be free from terminal semiacetal groups. Various methods are known for blocking the chain ends of the polymers, but all these methods are more or less complicated and expensive. The best known method is the acetylation of the terminal hydroxyoxy groups with acetic anhydride. After the reaction, the excess acetic anhydride and the acetic acid formed must be carefully removed from the polymer. The polyoxymethylene acetate thus obtained has a satisfactory thermal stability, but it is sensitive not only to the action of acids but also to the action of alkalies.

Methods for etherifiying the terminal groups are complicated, partially they give poor yields and the products obtained have a low molecular weight.

It is much simpler to produce copolymers of trioxane with stable terminal groups. By a suitable selection of the comonomers copolymers, can be obtained in which the disintegration starting at the chain ends comes to a standstill at the structural units of the comonomers. For preparing a stable copolymer of trioxane it is thus only necessary to subject the polymer to a thermal or alkaline aftertreatment. Especially favorable copolymer are those which contain in the chain oxyalkyl groups having at least two adjacent carbor atoms. They can be prepared quite easily, for example by copolymerizing trioxane with cyclic ethers or formals.

In practice, it is necessary to stabilize the copolymers of trioxane as well as the homopolymers against thermal degradation and oxidation. It is surprising that the stabilizers used for stabilizing the homopolymers of trioxane cannot be used in the same manner for stabilizing the copolymers. In many cases the stabilizers for homopolymers show no or only a little effect on copolymers, more frequently, however, it is just the opposite. It is particularly remarkable that the stabilizer combinations used for stabilizing trioxane copolymers show strong synergistic effects. Therefore, it is important always to use harmonized stabilizer combinations, one component of which mainly protects the copolymer against thermal degradation and the other mainly against oxidation. Urea compounds are known as stabilizers for homopolymers of formaldehyde. However, in the stabilization of the homopolymers, polyamides and amides of polybasic carboxylic acids have a distinctly better effect. For stabilizing copolymers of trioxane, amidines have been proposed as stabilizers. In many cases, however, their effect is not sufficient and, moreover, they have the tendency to cause cross-linking of the polymer.

It has now been found that copolymers of trioxane having oxyalkylene groups with 2 to 4 adjacent carbon atoms in the main chain, which chain may carry as substituents alkyl radicals of low molecular weight, can be stabilized by imidazolidone-2 and/or N-substituted imidazolidones-2. As imidazolidone-2 derivatives there are preferably used those products in which the nitrogen atom carries alkyl radicals having 1–18 carbon atoms, phenyl radicals, phenyl radicals having as substituents alkyl radicals with 1 to 18 carbon atoms and p-aminophenyl radicals. An especially good effect can be achieved when the aforesaid imidazolidones are used in combination with phenols and/or aromatic amines already known as stabilizers for homopolymers of trioxane. In the stabilization of the copolymers, imidazolidones are distinctly superior to polyamides, amides of polybasic carboxylic acids, urea compounds and amidines.

Besides imidazolidone-2 the following derivatives thereof are suitable, for example, as stabilizers according to the invention: 1,1-ethylene-bis-(imidazolidone), 1-(octadecylphenyl) imidazolidone, 1-phenyl-imidazolidone, 1-(p-dodecylphenyl)-3-hydroxymethyl-imidazolidone, 3,3-methylene-bis-(1-o-aminophenyl-imidazolidone), or 1-p-aminophenyl-imidazolidone.

An optimum stabilizing effect is obtained when the aforesaid imidazolidones are used together with phenols (for example the phenols defined in U.S. Patent 2,871,220 i.e., phenol and phenols having a pK at 25° C. of greater than 6.0 for every stage of dissociation of said substituted phenol) and/or aromatic amines (for example the amines defined in U.S. Patent 2,920,059 i.e., monomeric secondary aromatic amines and monomeric tertiary aromatic amines) already proposed for stabilizing homopolymers of trioxane. Suitable phenols are especially those which carry substituents in ortho and para position to the phenolic hydroxyl group, for example 2,6-dimethyl-4-tert-butyl phenol. Particularly suitable are bisphenols, for example 2,2-methylene-bis-(4-methyl-6-tert butylphenol) or condensation products from a phenol substituted in para position by a low molecular weight aliphatic hydrocarbon radical and formaldehyde, for example the condensation product from 4-tert-butyl phenol and formaldehyde.

Amines having a good stabilizing effect are, for example the derivatives of diphenyl amine, such as 4,4'-dioctyldiphenyl amine. Furthermore, there are well suitable aromatic amines carrying as substituents, besides the amino group, phenolic hydroxyl groups, amide groups or urea groups.

The above-mentioned stabilizer combinations confer upon copolymers of trioxane a heretofore unattainable thermal stability at processing temperatures in the range of about 190 to 250° C. and an outstanding stability to oxygen. The combinations are very easy to use. In most cases, it is sufficient to mechanically mix them with the copolymer. However, they can be applied to the polymer in any other manner.

The stabilizer concentration required for improving the thermal stability of high molecular weight copolymers of trioxane depends on the activity of the imidazolidone used, the phenol and/or aromatic amine and, moreover, on the type and the quality of the copolymer to be stabilized. Thus, the concentration can vary within wide limits. Each component of the stabilizer system can be used in a concentration in the range of from 0.01 to 10% by weight, calculated on the polymer, and preferably 0.05 to 5% by weight.

For testing the stability of the copolymers of trioxane samples with or without stabilizer were heated for a definite period of time at a temperature above 200° C., for example for 30 minutes at 220° C., and the loss in weight was determined. The tests were carried out in an inert atmosphere, for example under nitrogen, and in air or oxygen. A satisfactory stabilizer system must give good values under the most different conditions.

The term "copolymers of trioxane," as used herein, applies to copolymers which contain in the main chain oxalkyl groups having 2 to 4 adjacent carbon in an amount of 0.1 to 50% by weight, calculated on the total copolymer. The copolymers need not contain stable terminal groups. Terminal semiacetal groups can be eliminated from the copolymer after incorporation of the stabilizer system, for example by kneading the polymer at 180–220° C. under reduced pressure. In many cases it is more suitable, however, to stabilize copolymers having stable terminal groups. The stabilizers according to the invention can be used for stabilizing all copolymers having a reduced viscosity higher than 0.2, determined at 140° C. with a 0.5% solution of the copolymer in butyrolactone in the presence of 2% of diphenylamine.

and the complex compounds thereof as catalysts. Comonomers which are especially suitable for the manufacture of the copolymers are cyclic alkylene oxides preferably having 2 to 4 carbon atoms and the derivatives thereof, oxetanes and cyclic formals of, for example, glycol, 1,3-butane-diol and 1,4-butane-diol, diethylene glycol or 1,4-butane-diol-2. In some cases it may be advisable to incorporate into the copolymer further stabilizers for example amides of polybasic carboxylic acids, polyamides or compounds of bivalent sulfur. An any case, it is favorable to use additionally a light stabilizer, for example an α-hydroxybenzophenone.

The stabilizer system can be incorporated into the copolymer in any known manner. Particularly suitable are methods which allow for a uniform distribution of the finely divided stabilizers in the copolymer. For example, the finely ground stabilizers can be incorporated into the copolymer of high molecular weight in a dry mixer or on a roll mill. Alternatively, the stabilizers can be dissolved in a solvent, for example methanol or acetone, the copolymer can be suspended in the solution obtained and the solvent can be evaporated until the mixture is dry. Sometimes, it may be especially favorable to incorporate the stabilizer system into the melt of the copolymer. In this case labile polymer constituents may be eliminated.

The high molecular weight copolymers of trioxane which have been stabilized by the process of the present invention can be used, particularly when they contain stable terminal groups, for the manufacture of fibers, foils and films, and, moreover, for making tubes, profiles and injection molded articles.

The following examples serve to illustrate the invention but they are not intended to limit it thereto, the percentages being by weight unless otherwise stated.

EXAMPLE 1

10 grams each of finely ground copolymer of trioxane and 4% by weight of diethylene glycol formal which was free from unstable portions were intimately mixed with the compounds specified in Table 1. The stabilized samples were then heated for 90 minutes at 220° C. under nitrogen and for 90 minutes at 230° C. in air. The loss in weight of the samples is indicated in Table 1. The test results show that the compounds of the invention are superior to various other stabilizers.

| Stabilizer 1 | Percent | Stabilizer 2 | Percent | Loss in weight, Percent | |
|---|---|---|---|---|---|
| | | | | 90 min. 220° C. in $N_2$ | 90 min. 230° C. in air |
| 4,4'-dioctyl-diphenylamine | 0.5 | 1,1-ethylene-bis-imidazolidone-2 | 1 | 15 | 27 |
| Do | 0.5 | 1(p-octadecyl-phenyl)-imidazolidone-2 | 1 | 1.6 | 1.8 |
| Do | 0.5 | 1(p-dodecyl-phenyl)-3-hydroxymethyl-imidazolidone-2 | 1 | 2.6 | 3.5 |
| Do | 0.5 | | | 1.0 | 2.6 |
| Do | 0.5 | N-o-hydroxy-phenyl-N'-2-hydroxyethyl-urea | 1 | 6.5 | 10.2 |
| Do | 0.5 | Methylene-bis-acrylamide | 1 | 5.6 | 9.1 |
| Do | 0.5 | β-naphthylthio urea | 1 | 6.8 | 11.0 |
| | | | | 7.0 | 9.9 |

Copolymers having a reduced viscosity in the range from 0.5 to 2 are preferably used. Although, on principle, all trioxane copolymers having a reduced viscosity within the specified limits can be stabilized, it is advantageous to use copolymers already having a certain minimum stability, for example copolymers which lose at most 10% of their weight when heated for 30 minutes at 220° C.

Copolymers of trioxane of high molecular weight can be readily produced by cationic polymerization, e.g., of trioxane preferably in the presence of boron trifluoride

EXAMPLE 2

The stabilizers specified in Table 2 were dissolved in methanol. In the solutions there was suspended each time a high molecular weight copolymer of trioxane and 2% of ethylene oxide having stable terminal groups. The solvent was then evaporated while stirring until the mixture was dry. The stability of the samples was tested under the conditions set forth in the following Table 2. Table 2 likewise illustrates the superiority of the claimed stabilizer combinations over known compounds.

Table 2

| Stabilizer 1 | Percent | Stabilizer 2 | Percent | Percent loss in weight after heating for— | | |
|---|---|---|---|---|---|---|
| | | | | 90'/220° C. $N_2$ | 45'/230° C. air | 45'/230° C. $O_2$ |
| 2,2-methylene-bis(4-methyl-6 t. butylphenol) | 1 | | | 10.7 | 23.0 | 45.0 |
| Do | 1 | | | 6.1 | 2.2 | 8.1 |
| Do | 1 | 1,1-ethylene-bis-imidazolidone-2 | 1 | 2.4 | 1.27 | 5.1 |
| Do | 1 | 1(p-octadecylphenylimidazolidone-2) | 1 | 1.7 | 1.60 | 4.9 |
| Do | 1 | 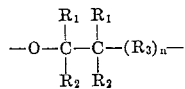 | 1 | 1.4 | 0.93 | 4.0 |
| Condensation product from p-isobornyl-phenol+$CH_2O$ | 1 | | | 3.5 | 2.1 | 11.2 |
| Do | 1 | 3,3-methylene-bis-(1-o-aminophenylimidazolidone-2) | 1 | 2.5 | 1.62 | 5.1 |
| Do | 1 | 1,1-ethylene-bis-imidazolidone-2 | 1 | 2.0 | 1.02 | 1.7 |
| Do | 1 | p-aminophenylimidazolidone-2 | 1 | 1.2 | 0.93 | 4.0 |
| 2,2-methylene-bis-(4-methyl-6 t. butylphenol) | 1 | N,N'-diphenyl urea | 1 | 3.5 | 2.07 | 6.5 |
| Do | 1 | Urea | 1 | 5.1 | 2.21 | 7.0 |
| Do | 1 | Malonic acid diamide | 1 | 4.1 | 2.13 | 8.2 |
| Do | 1 | Melamine | 1 | 3.1 | 1.85 | 6.5 |

EXAMPLE 3

The compounds mentioned in Table 3 were mechanically incorporated into an acetylized homopolymer of trioxane and the loss in weight of these samples was determined after heating for 30 minutes at 220° C. under nitrogen. The table shows that the stabilizer combinations do not have a synergistic effect with trioxane homopolymers. Moreover, the imidazolidones are not superior to other stabilizers when used for stabilizing trioxane homopolymers.

Table 3

| Stabilizer 1 | Percent | Stabilizer 2 | Percent | Loss in weight when heated for 30' at 220° C. under $N_2$ |
|---|---|---|---|---|
| Malonic acid diamide | 1 | | | 3.7 |
| Do | 1 | 2,2-methylene-(4-methyl-6-t-butylphenol) | 0.5 | 3.8 |
| Methoxymethyl-polycaprolactam | 1 | | | 3.2 |
| Urea-carboxylic acid ethyl ester | 1 | | | 6.2 |
| 1,1-ethylene-bis-imidazolidone | 1 | | | 4.0 |
| Do | 1 | 2,2-methylene-bis-(4-methyl-6-t-butylphenol) | 0.5 | 3.9 |

We claim:

1. A thermally stabilized copolymer of trioxane having repeating units consisting essentially of —$OCH_2$— groups interspersed with oxyalkylene groups of the formula $$-O-\underset{R_2}{\overset{R_1}{C}}-\underset{R_2}{\overset{R_1}{C}}-(R_3)_n-$$

in which $R_1$ and $R_2$ are hydrogen or lower alkyl, $R_3$ is methylene, lower alkyl-substituted methylene or lower alkyl-substituted oxymethylene and $n$ is an integer from zero to two, said copolymer being in intimate admixture with from about 0.01 to 10% by weight of imidazolidone-2, an imidazolidone-2 substituted on the nitrogen atom by alkyl of 1 to 18 carbon atoms, phenyl, aminophenyl or alkylphenyl in which the alkyl group contains 1 to 18 carbon atoms, or a combination of said imidazolidones as stabilizer.

2. A thermally stabilized copolymer of trioxane as defined in claim 1 wherein the concentration of stabilizer is in the range of about 0.05 to 5% by weight.

3. A thermally stabilized copolymer of trioxane as defined in claim 1 having a reduced viscosity higher than 0.2 as determined at 140° C. with a 0.5% solution of the copolymer in butyrolactone in the presence of 2% diphenylamine.

4. A thermally stabilized copolymer of trioxane as defined in claim 1 wherein the oxyalkylene groups are present to the extent of 0.1 to 50% by weight.

5. A thermally stabilized copolymer of trioxane as defined in claim 1 containing, in addition, a known polyoxymethylene stabilizing agent selected from the group consisting of phenol, substituted phenols having a pK at 25° C. of greater than 6.0 for every stage of dissociation of said substituted phenol, monomeric secondary aromatic amines and monomeric tertiary aromatic amines.

6. A copolymer of trioxane with from 0.1 to 50% by weight diethylene glycol formal thermally stabilized by intimate admixture with from about 0.01 to 10% by weight 1,1 - ethylene-bis-imidazolidone-2, 1-(p-octadecylphenyl)-imidazolidone - 2 or 1 - (p-dodecylphenyl)-3-hydroxy methylimidazolidone-2.

7. A copolymer of trioxane with from 0.1 to 50% by weight ethylene oxide thermally stabilized by intimate admixture with from about 0.01 to 10% by weight 1,1 - ethylene-bis-imidazolidone-2, 1-(p-octadecylphenyl)-imidazolidone - 2,3,3 - methylene-bis-(1-o-aminophenyl)-imidazolidone-2 or p-aminophenyl imidazolidone-2.

8. A copolymer as defined in claim 1 in intimate admixture with from about 0.01 to 10% by weight of imidazolidine-2, 1,1-ethylene - bis - imidazolidone-2, 1-octadecylphenyl imidazolidone-2, 1-phenyl-imidazolidone-2, 1-(p-dodecylphenyl)-3-hydroxymethyl imidazolidone-2, 3,3-methylene-bis-(1-o-aminophenyl-imidazolidone-2) or 1-p-aminophenyl-imidazolidone-2.

References Cited by the Examiner

UNITED STATES PATENTS 2,871,220  1/1959  MacDonald _____ 260—45.95

LEON J. BERCOVITZ, *Primary Examiner.*

M. J. WELSH, *Assistant Examiner.*